(12) United States Patent
Gustafsson et al.

(10) Patent No.: US 6,303,066 B1
(45) Date of Patent: Oct. 16, 2001

(54) APPARATUS AND METHOD FOR MOLDING AN OPENING DEVICE ON A PACKAGING SHEET

(75) Inventors: Per Gustafsson, Bjärred (SE); Antonio Rendina, Carpi (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/269,507

(22) PCT Filed: Sep. 23, 1997

(86) PCT No.: PCT/SE97/01594

§ 371 Date: Mar. 29, 1999

§ 102(e) Date: Mar. 29, 1999

(87) PCT Pub. No.: WO98/18608

PCT Pub. Date: May 7, 1998

(30) Foreign Application Priority Data

Oct. 31, 1996 (IT) ................................. MI96A2272

(51) Int. Cl.⁷ ........................... B29C 45/14; B29C 45/26; B29C 45/64
(52) U.S. Cl. ........................... 264/267; 264/274; 264/275; 425/125; 425/129.1; 425/592
(58) Field of Search ..................... 264/267, 275, 264/273, 328.1, 274; 475/112, 129.1; 425/589, 592, 593, 125

(56) References Cited

U.S. PATENT DOCUMENTS

| | | | |
|---|---|---|---|
| 4,244,491 | * | 1/1981 | Takahashi et al. ............... 220/270 |
| 4,725,213 | | 2/1988 | Reil et al. ........................ 425/117 |
| 5,049,336 | | 9/1991 | Sjöström ......................... 264/154 |
| 5,395,005 | * | 3/1995 | Yoshida ........................... 220/359 |

FOREIGN PATENT DOCUMENTS

| | | |
|---|---|---|
| 0 370 142 | 5/1990 | (EP) . |
| 659191 | 10/1951 | (GB) . |
| 1023886 | 3/1966 | (GB) . |

* cited by examiner

Primary Examiner—Jan H. Silbaugh
Assistant Examiner—Edmund H. Lee
(74) Attorney, Agent, or Firm—Burns, Doane, Swecker & Mathis, L.L.P.

(57) ABSTRACT

An apparatus and method for molding opening devices onto a packaging material sheet at respective holes provided in the sheet. The apparatus includes first and second mold tools arrangeable in a closed position so as to be in contact with opposite sides of the sheet and in an open position so as to be positioned distally from the sheet. In the closed positions a mold cavity is formed between the first and second mold tools for accommodating a hole edge in the sheet. The apparatus further includes an injection passage for injecting heated thermoplastics material into the mold cavity, which injection passage extends in one of the mold tools such that the thermoplastics material is injected directly into the mold cavity at an injection point of the mold cavity which is located distally from the hole edge, for providing effective formation of the opening device on the sheet. One of the mold tools includes a pair of half mold tools which are simultaneously moved from the open position to the closed position and vice versa such that the direction of movement of each of said half mold tools between the open and closed positions tangentially follows a circular path, for reducing wear of the mold tools. In the closed position of the mold tools, the sheet extends in a plane which is distally spaced from the plane of extension of the sheet in the open position aiding in release of the sheet and the molded opening device from the mold tools.

11 Claims, 7 Drawing Sheets

APPARATUS AND METHOD FOR MOLDING AN OPENING DEVICE ON A PACKAGING SHEET

TECHNICAL FIELD

The present invention relates to an apparatus and a method for direct injection moulding of a plastics material opening device to a hole provided on a sheet of packaging material. The term "opening device" as used herein, refers mainly to opening devices used for pouring liquid contents from a container, but also includes opening devices which may be used for filling a container.

BACKGROUND ART

Opening devices of different types provided on a packaging container formed by packaging sheet material and adapted for containing substances such as foodstuffs, and in particular for containing liquid beverages such as juices, water, milk, wine, etc. are known.

One such opening device includes a perforation on a wall part of the packaging container and a plastics material lid device attached to the wall part and covering the perforation in a closed state. The lid device includes a circumferential base attached to the wall part, for example by means of adhesives, circumferentially surrounding the perforation, and a lid element hinged to the base. Once the lid element is opened, the perforation may be engaged and forced open so that the contents inside the packaging container may be dispensed therefrom.

Another known opening device includes an opening provided on a wall part of the packaging container and a plastics material lid device similar to the one described above attached to the wall part and covering the opening in a closed state. A sealing element such as an aluminium pull tab is connected to the wall part so as to cover the opening, and once the lid element has been opened, the sealing element may be removed to expose the opening for dispensing the contents of the packaging container.

Methods for providing the above opening devices on the packaging containers may include feeding a continuous web of packaging material to a first station at which the perforation or opening is provided on the web, and to a second station at which the lid element is attached to the web for covering the perforation or opening. The aluminium pull tab, if provided i.e. for covering the opening, is attached in an intermediate step. After the opening devices are provided on the web, packaging containers from the web are formed, filled with product, and sealed, such that the opening devices are arranged on the finished container packagings for easy access.

One example of a machine for forming, filling, and sealing packaging containers is the TB8 filling machine, manufactured by Tetra Brik Packaging Systems of Modena, Italy.

As an alternative to the above opening devices, in which an already formed plastics material lid device is applied to the sheet, U.S. Pat. No. 4,725,213 (the disclosure of which is incorporated herein by reference) discloses a plastics material opening device which is injection moulded directly onto the sheet of packaging material. In particular, a pair of mould tools are moved into arrangement about a prestamped hole in the sheet, and heated thermoplastics material is injected through an injection passage defined between one of the mould tools and one surface of the sheet and extending along such surface of the sheet in order to form the opening device at the prestamped hole.

Although the method and apparatus for providing this latter type of opening device may be completely valid, there exists in the field of thermoplastics material injected opening devices the need for further improvements.

The injection passage in U.S. Pat. No. 4,725,213 extends from the injector head for a significant distance along one surface of the sheet to one end of the mould cavity for forming the opening device, so as to create a number of disadvantageous effects. Since the injection passage enters the mould cavity at one end, the complete filling of the mould cavity with heated thermoplastics material is rendered difficult and inefficient particularly at the portion of the mould cavity arranged distally from the injection passage. Moreover, if the injection passage extending along one surface of the sheet is excessively long, the filling of the mould cavity is rendered even more difficult and inefficient, and therefore the apparatus and method are limited to moulding opening devices arranged substantially only near the edge of the sheet at which the injection head is positioned. Additionally, a strip of plastics material is formed in the injection passage, and further steps must be made to eliminate such strip, which is additionally inefficient and which creates the possibility of damaging the opening device from which such strip must be removed. Further complications arise from subjecting the surface of the sheet of packaging material, which generally has a very low stiffness and resistance, to thermoplastics material at elevated pressures and temperatures injected into the injection passage.

The above described difficulties in completely filling the mould cavity may lead to a situation in which plastics material will not flow to all parts of the mould cavity and as a result, the edge of the opening may not be sufficiently sealed by plastics material of the opening device. Generally, the packaging sheet material is formed of several layers including an inner paper layer and two outer synthetic plastics material coating layers, one of which is destined to form a product contact surface. Other possible layers such as printing ink layers, laminating layers and aluminium foil layers may be interposed between the paper layer and the outer coating layers. When the opening in the packaging sheet material is stamped, the internal layers of the packaging sheet are exposed at the edge of the opening, and unless such edge is adequately sealed by the injected thermoplastics material opening device, the packaged product may come into contact with the internal layers of the packaging sheet material possibly causing damage thereto. Moreover, the overall efficiency of the apparatus and method is compromised when the time needed to inject the heated thermoplastics material for each mould operation is increased so as to assure an adequate filling of the mould cavity.

The mould tools in U.S. Pat. No. 4,725,213 consist of a pair of mould tools which are both movable in opening and closing directions which extend perpendicularly to the extension of the sheet. Such a configuration substantially limits the flexibility of the device in forming opening devices with different shapes, since the mould tools must not encounter any portions of the opening device which protrude in a direction perpendicular to the direction of movement of the mould tools. The injection moulded opening device of U.S. Pat. No. 4,725,213 indeed includes a pull tab which extends in a direction perpendicular to the sheet, for a long extension sufficient to be gripped by a user. Such an extensively protruding pull tab is disadvantageous with regard to storing and shipping packaging containers including an opening device of this type.

It is furthermore desirous to have opening devices with base portions connected to the sheet hole and lid portions positioned in planes which are slightly raised with respect to the base portions and the packaging sheet. These lid portions have an edge or lip which extends parallel to the extension of the packaging sheet, so that they may be gripped and opened by a user. The apparatus of U.S. Pat. No. 4,725,213 is incapable of forming opening devices of this type due to the opening movement of the mould tools.

What is needed is an apparatus and method for injection moulding a thermoplastics material opening device onto a packaging material sheet which allows to assure that the opening device is moulded in a most effective and efficient manner possible.

DISCLOSURE OF THE INVENTION

In accordance with one preferred aspect of the invention, there is provided in a packaging machine for forming package containers from a driven web of packaging sheet material, an opening device moulding station for moulding opening devices on to the web at respective holes provided in the web, which opening device moulding station includes first and second mould tools releasably arrangeable in closed positions so as to form a mould cavity for accommodating the hole edge of the web. An injection passage for injecting heated thermoplastics material into the mould cavity extends in at least one of the first and second mould tools such that the thermoplastics material is injected directly into the mould cavity at an injection point of the mould cavity which is located distally from the hole edge.

By having the injection point arranged distally from the hole edge, the heated thermoplastics material advantageously enters the mould cavity at a position which permits the filling of the mould cavity to be carried out in an effective and efficient manner. The heated plastics material will flow from the injection point smoothly and evenly initially distally from the hole edge and successively fill the mould cavity so that the heated plastics material makes contact with the hole edge at the end of the injection step. The times required for each injection step are therefore minimised in order to increase the efficiency of the opening device moulding operation.

According to a most preferred aspect of the invention, the injection point is arranged at a lid forming portion of the mould cavity, in a substantially central position with respect to a base forming portion of the mould cavity, and the injection passage extends in one of the mould tools in a direction which is substantially perpendicular to the extension of the lid forming portion of the mould cavity. Such a configuration allows to fully maximise the efficiency of material flow from the injection point in a symmetrical and even manner initially distally from the hole edge and successively to fill the base forming portion of the mould cavity. Such configuration also allows to fully avoid subjecting surfaces of the web to the flow of heated thermoplastics material.

In accordance with another preferred aspect of the invention, there is provided an opening device moulding apparatus for moulding plastics material opening devices on to a sheet at respective holes provided in the sheet, which opening device moulding apparatus includes first and second mould tools releasably arrangeable in closed positions so as to form a mould cavity for accommodating the hole edge of the sheet, a drive mechanism for selectively moving the first mould tool and said second mould tool between the open and closed positions, and at least one of the first and second mould tools includes a pair of half mould tools. The drive mechanism includes a supporting structure for supporting the half mould tools such that in the open position the half mould tools are mutually spaced from each other in an extension plane extending substantially parallel to the plane of extension of the sheet and such that in the closed position the half mould tools are mutually arranged in contact with each other. The drive mechanism further includes a driver for moving the half mould tools simultaneously from the open position to the closed position and vice versa such that the direction of movement of each of the half mould tools between the open and closed positions comprises a directional component extending parallel to the sheet extension plane and a directional component extending perpendicularly to the sheet extension plane.

With such a configuration of the drive mechanism, it is advantageously possible to effectively directly mould opening devices of many various shapes which may include, in particular, portions which protrude and extend in a plane which is parallel to the extension plane of the sheet. Moreover, the particular configuration of the drive mechanism is such that the half mould tools mutually arrive and make contact together at the closed position with a delicate approach so as to provide for minimum wear of the half mould tools. According to a most preferred embodiment, the drive mechanism is configured such that the direction of movement of each of the half mould tools between the open and closed positions tangentially follows a circular path, thereby for minimising the space requirements of the opening device moulding apparatus and for minimising wear on the half mould tools.

In accordance with yet another aspect of the invention, there is provided an opening device moulding apparatus for injection moulding plastics material opening devices at holes in a packaging material sheet, including first and second mould tools arrangeable in open and closed positions respectively spaced apart from and engaging the sheet, wherein in the closed position the sheet extends in a plane which is distally spaced from the plane of extension of the sheet in the open position. When the sheet is spaced from its normal extension by the mould tools in the closed position, it is put under an added tension which advantageously facilitates the release of the sheet and moulded opening device from the mould tools as such mould tools move away from the closed position to the open position.

The technical characteristics and advantages of the present invention will become apparent to those skilled in the art from the following detailed description of some preferred embodiments thereof, described and illustrated in the accompanying drawings only by way of non-limitative example, wherein like reference numerals indicate like parts.

BEST MODES FOR CARRYING OUT THE INVENTION

Figure 1:
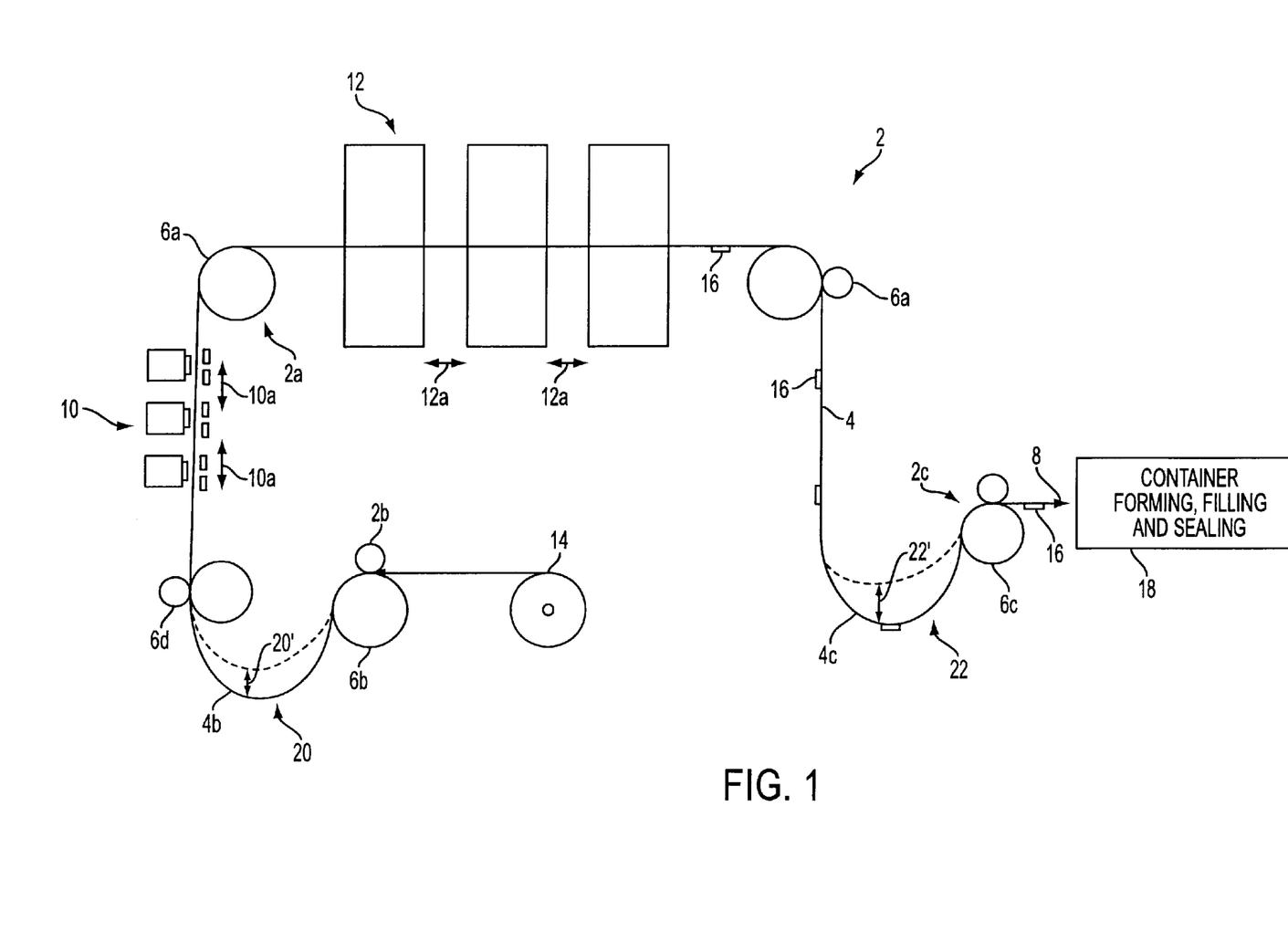
FIG. 1 is a schematic view showing feeding of a web of packaging sheet material in a packing machine including an opening device moulding station in accordance with one preferred aspect of the invention.
Figure 2:
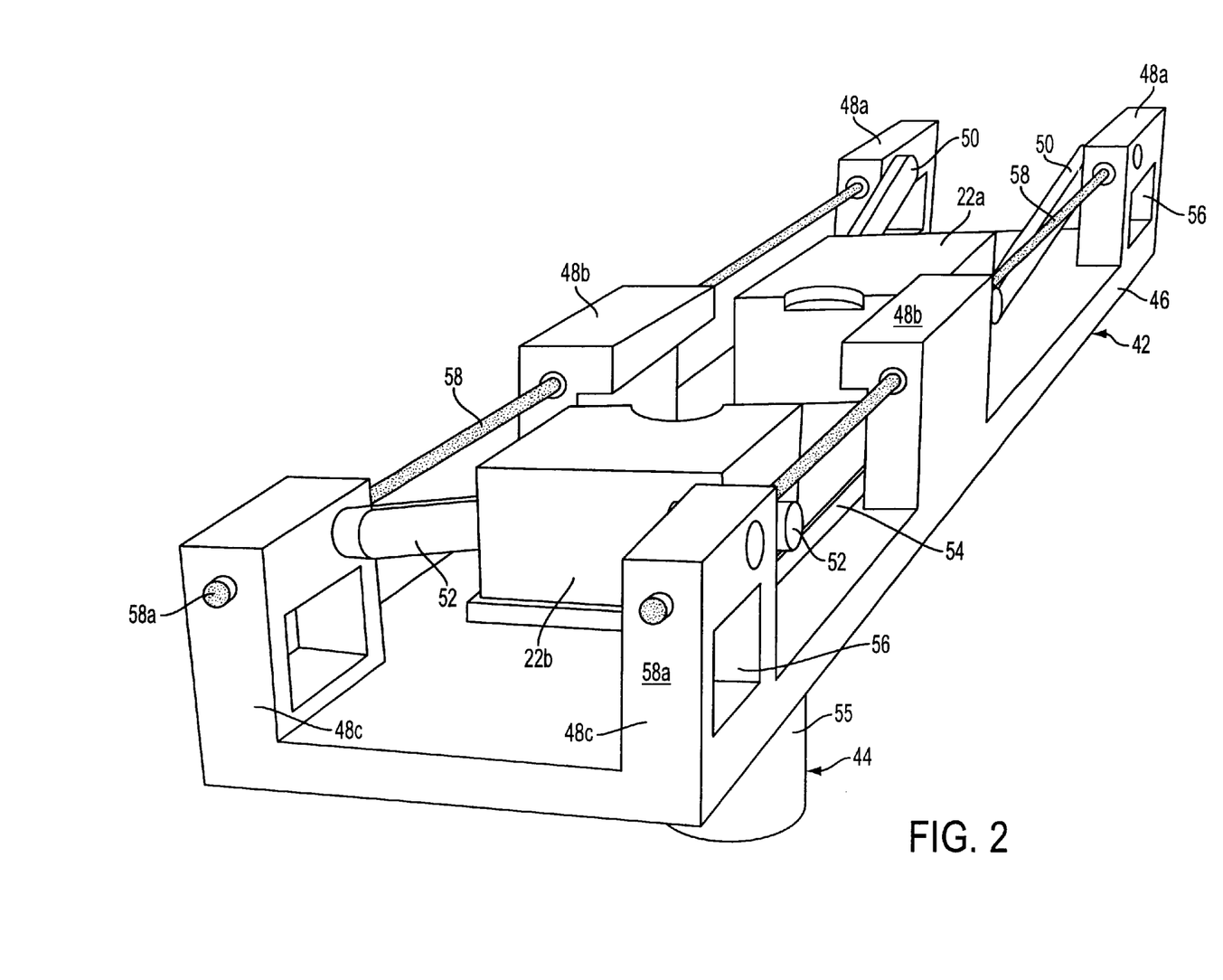
FIG. 2 is a perspective view of the lower portion of an opening device moulding station in a first preferred embodiment of the invention.

With initial reference to FIG. 1, there is shown an apparatus 2 according to the invention, and the reference numeral 18 indicates a packaging machine for forming package containers from a packaging sheet material web 4. It will be understood that the apparatus 2 may be either incorporated in the packaging machine or filling machine 18, or located upstream of such machine. Web 4 is fed through packaging machine 2 by means of an appropriate drive 6a–e in a feed direction 8. Drive 6a–e is adapted for intermittently feeding web 4 at an intermittent feed section 2a of machine 2, and for continuously feeding web 4 at a continuous infeed section 2b and a continuous outfeed section 2c, arranged respectively upstream and downstream of the intermittent feed section 2a with respect to web feed direction 8.

At intermittent feed section 2a, there are arranged a hole punching station 10 for punching holes in web 4, and an opening device moulding station 12 for injection moulding thermoplastics material opening devices at the holes provided on web 4. Drive 6a–e is adapted for intermittently feeding web 4 through hole punching station 10 such that web 4 is appropriately stopped and correctly positioned at hole punching station 10 for a time sufficient to punch the holes in web 4, and drive 6a–e is also adapted for intermittently feeding web 4 through opening device moulding station 10 such that the holes in web 4 are appropriately stopped and correctly positioned at opening device moulding station 10 for a time sufficient to mould opening devices at the holes punched previously at hole punching station 10.

Drive 6a–e includes continuous feed rollers 6b and 6c arranged respectively at continuous infeed section 2b for unwinding and feeding web 4 from a reel 14 of packaging material web, and at continuous outfeed section 2c for continuously feeding web 4 with opening devices 16 moulded thereon to a container forming station 18 for forming and sealing containers from web 4 and filling the containers with product.

Drive 6a–e further includes at intermittent feed section 2a intermittent feed rollers 6a, tensioning rollers 6d, and an idler roller 6e which together mutually cooperate so as to maintain the tension of web 4 at intermittent feed section 2a substantially constant in a stopped position, so that the hole punching and opening device moulding operations may be carried out with sufficient precision. Moreover, the particular arrangement of drive 6a–e forms an infeed buffer magazine 20 and an outfeed buffer magazine 22. Infeed buffer magazine 20 includes a changing infeed web length 4b which extends between tensioning rollers 6d and continuous feed rollers 6b and which moves vertically along direction 20' such that infeed web length 4b changes in size (as indicated by dashed lines in FIG. 1) to appropriately compensate for the interface between intermittent feed section 2a and continuous infeed section 2b. Similarly, outfeed buffer magazine 22 includes a changing outfeed web length 4c which extends between intermittent drive rollers 6a and continuous feed rollers 6c and which moves vertically in direction 22' such that outfeed web length 4c changes in size (as indicated by dashed lines in FIG. 1) to appropriately compensate for the interface between intermittent feed section 2a and continuous outfeed section 2c. In this manner the feeding of web 4 is continuous at roll 14 and container forming station 18 while the feeding of web 4 is intermittent at hole punching station 10 and opening device moulding station 12.

In FIG. 1, three hole punching stations 10 and three opening device moulding stations 12 are shown, such that three holes are formed in web 4 and three opening devices are moulded in web 4 for each intermittent stopped position of web 4. The particular number of hole punching stations 10 and opening device moulding stations 12 may vary according to the requirements. Moreover, hole punching stations 10 and opening device moulding stations 12 may move relative to one another respectively in directions 10a and 12a along the extension of feeding of web 4, so that the holes and opening devices provided on web may be relatively spaced in different positions to allow to form packaging containers of different sizes.

Apparatus and methods for feeding web 4, for punching holes in web 4, and for forming and sealing containers from web 4 and filling the containers with product, in the manner as described above, are known, and for example are included in the TBA/19-System manufactured by Tetra Brik of Modena, Italy.

Opening device moulding station 10 positioned in combination with packaging machine 2 advantageously provides an efficient and effective means for continuously moulding an opening device on a web fed from a roll and for successively forming, sealing, and filling a packaging container in the same compact line and continuous method. The adhesion of separately formed and supplied opening devices to the web, as is carried out in conventional apparatus, is eliminated, thereby to provide savings in time and cost related to the separate production, storage, and transport of the separately formed opening devices. While opening device moulding station 10 is particularly advantageous for these reasons, it is envisaged that opening device moulding station 10 may operate in many different manners, for example to mould opening devices on a fed web which is then rolled into a web reel for later use, or for example to mould opening devices on any type and shape of packaging sheet material such as packaging material blanks or protruding packaging material flaps to mention only a few. Moreover, packaging machine 2 may be provided in an alternative form, such that web reel 14 is already provided with prestamped holes so as to allow to eliminate hole punch station 10, and/or such that the entire drive of web 4 is performed intermittently. Additionally, container forming station 18 may be any one of a number of forming stations used to form and seal packages of different sizes and shapes and to fill different products into the formed packages.

FIGS. 2–4b show a first preferred embodiment of opening device moulding station 10'. Opening device moulding station 10' includes a first mould tool 20 and a second mould tool 22 which are arrangeable relative to web 4 in closed positions so as to be in contact respectively with a first side 24 of web 4 and a second side 26 of web 4 (FIGS. 4a and 4b), when web 4 is in a stopped position at opening device moulding station 10'. First mould tool 20 and second mould tool 22 are also arrangeable relative to web 4 in open positions so as to be positioned distally respectively from first web side 24 and second web side 26 (FIG. 3), so as to allow the intermittent feeding of web 4 in feed direction 8.

In the particular embodiment shown, first mould tool 20 includes a single inner mould tool 20 which in operates in a fixed position, and second mould tool 22 includes a pair of half outer mould tools 22a and 22b which are driven between the open and closed positions relative to one another, and relative to web 4 and to inner mould tool 20, by a drive mechanism which is described hereinafter. Inner mould tool 20 is arranged for contact with web first side 24 destined to form an inner side of the packaging container formed with web 4, while outer mould tools 22a and 22b are arranged for contact with web second side 26 destined to form an outer side of the packaging container formed with web 4.

Figure 4A:
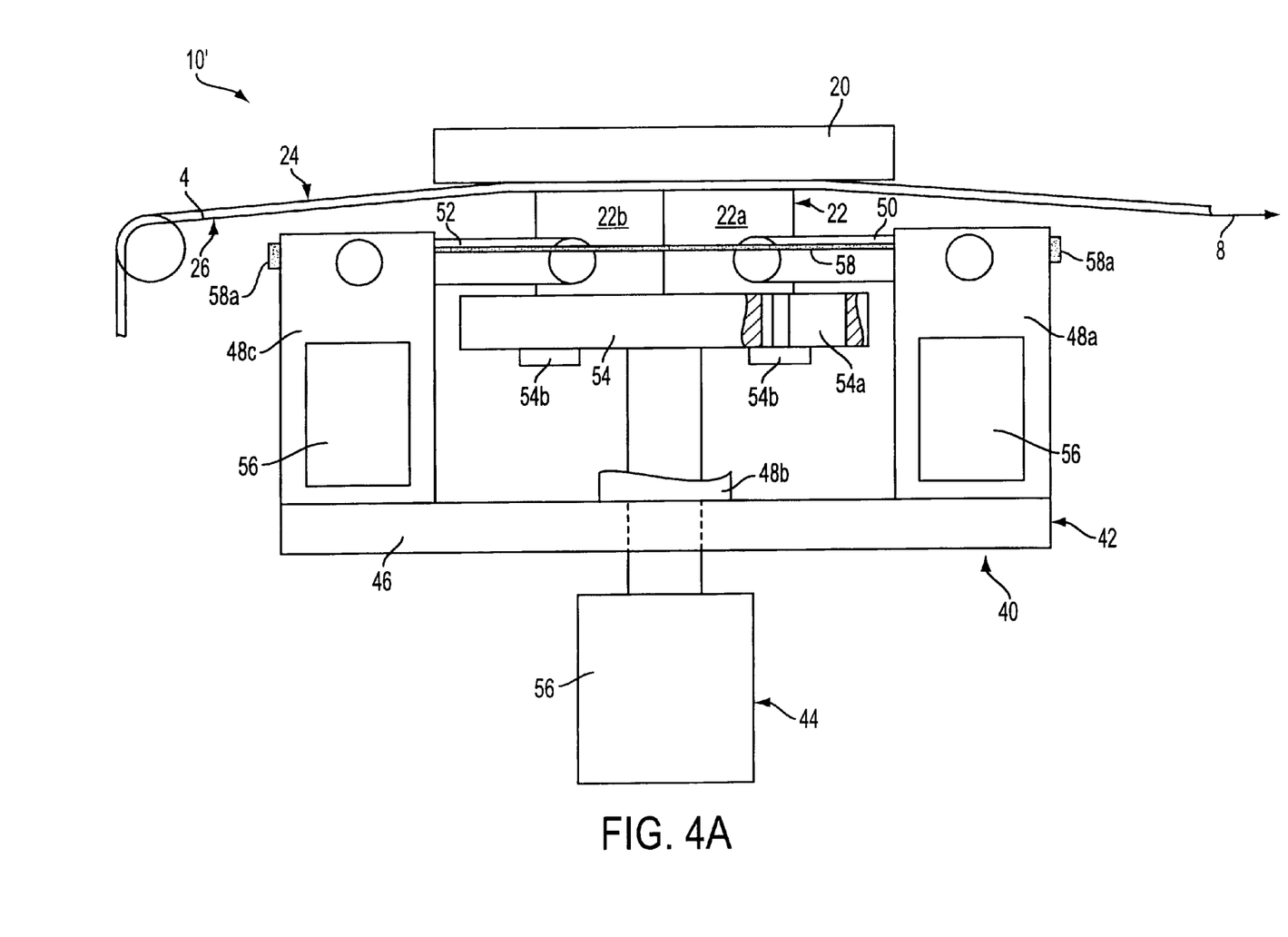
FIG. 4a is a partially sectional side elevation view of the opening device of FIG. 3 in which the mould tools are in a closed position.
Figure 4B:
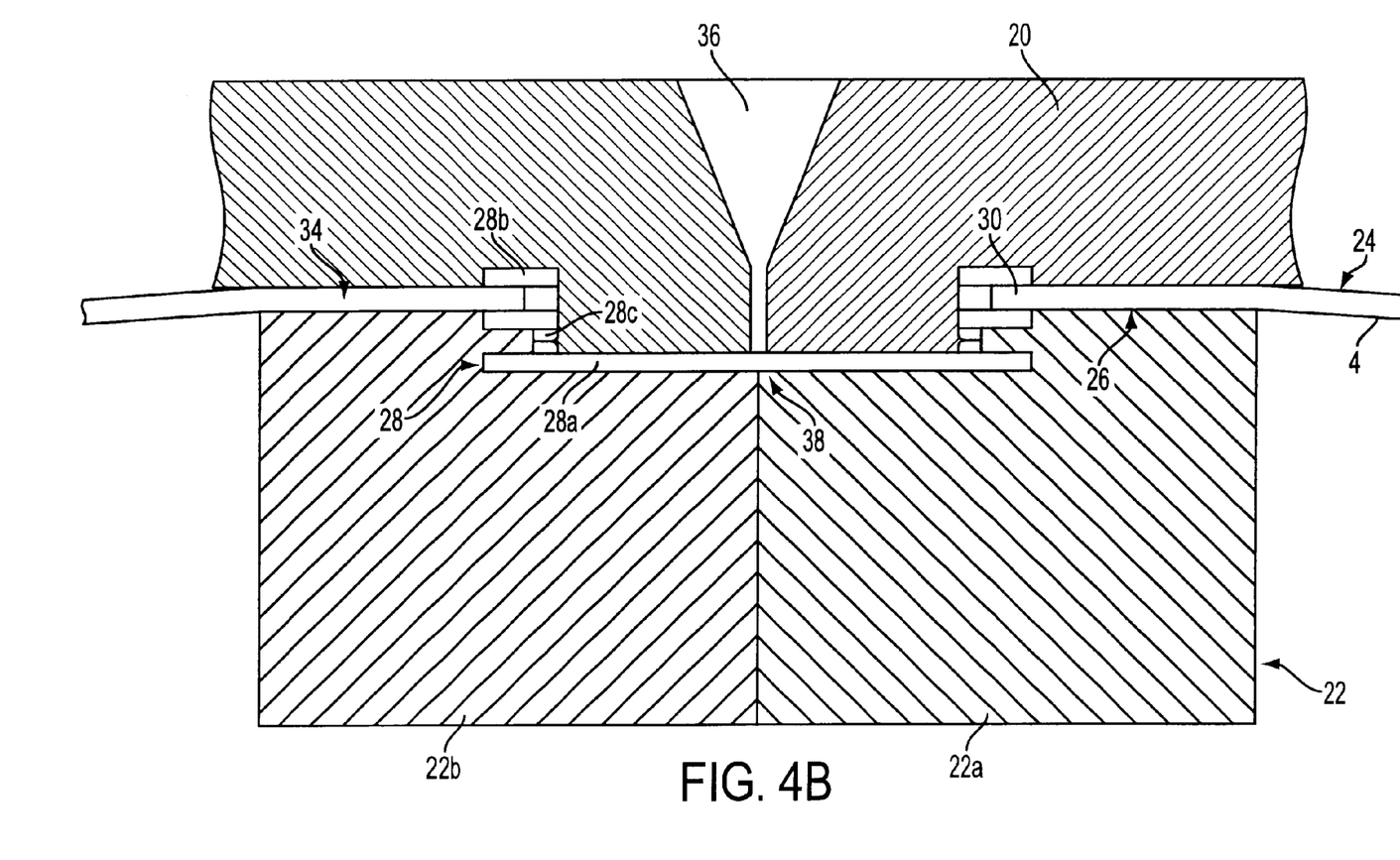
FIG. 4b is an enlarged sectional detail view of the web disposed between the mould tools of FIG. 4a in the closed position forming a mould cavity ready for heated thermoplastics injection moulding.

With particular reference to FIG. 4b, in the closed moulding positions of inner mould tool 20 and half outer mould tools 22a and 22b, a mould cavity 28 is formed between inner mould tool 20 and half outer mould tools 22a and 22b in which a hole edge 30, of a hole 32 in web 4 correctly positioned at opening device moulding station 10', is accommodated.

Mould cavity 28 includes in the embodiment shown a portion 28a for forming a lid portion of the opening device 16, a portion 28b for forming a base portion of opening device 16 for connection to web 4, and a connecting portion 28c for forming a reduced thickness tearing edge of opening device 16 for aiding in releasing the lid portion from the base portion. The present disclosure relates more in particular to the manner in which opening device is moulded to web 4 at hole edge 30 thereof, while opening device 16 may assume any number of different overall shapes.

In the embodiment shown, hole edge 30 is circumferential to completely enclose the hole in web 4, and preferably the entire hole edge 30 is arranged inside base forming portion 28a of mould cavity 28 prior to injection, while base forming portion 28b is also circumferential and has a dimension sufficient to completely enclose hole edge 30. Preferably, hole edge 30, base forming portion 28b, and connecting portion 28c are ovular ring-shaped in a longitudinal cross section extending substantially parallel to the extension of web 4, and lid forming portion 28a is ovular disc-shaped in a longitudinal cross section extending substantially parallel to the extension of web 4, Moreover, in the closed moulding position a gap 34 is formed between upper and lower mould tools 20 and 22 which preferably has a width dimension smaller than the thickness of packaging web material 4 thereby to compress web 4 inside gap 34 and form a seal sufficient to prevent any significant leakage of the heated thermoplastics material outside of mould cavity 28.

Opening device moulding station 10' further includes an injection passage 36 for injecting heated thermoplastics material into mould cavity 28. Injection of heated thermoplastics material through injection passage 36 may be carried out using any conventional method and apparatus known and available to a skilled person in the art.

Injection passage 36 extends in fixed inner mould tool 20 in the particular embodiment shown, and in accordance with a preferred aspect of the invention, injection passage 36 is configured such that thermoplastics material is injected directly into mould cavity 28 at an injection point 38 of mould cavity 28 which is located distally from hole edge 30.

By having injection point 38 arranged distally from hole edge 30, the heated thermoplastics material advantageously enters the mould cavity at a position which permits the filling of the mould cavity to be carried out in an effective and efficient manner. The heated plastics material will flow from injection point 38 smoothly and evenly initially distally from hole edge 30 and successively to fill base forming portion 28b of mould cavity 28 so that the heated plastics material makes contact with hole, edge 30 at the end of the injection step. The times required for each injection step are minimised in order to increase the efficiency of the opening device moulding operation.

Injection point 38 in the particular embodiment is arranged at lid forming portion 28a of mould cavity 28, in a substantially central position with respect to base forming portion 28b. Such an arrangement allows to fully maximise the efficiency of material flow from injection point 38 symmetrically and evenly initially distally from hole edge 30 and successively to fill base forming portion 28b of mould cavity 28.

Moreover, injection passage 36 extends in inner mould tool 20 in a direction which is substantially perpendicular to the extension of lid forming portion 28c of mould cavity 28 so as to fully avoid subjecting surfaces of web 4 to the flow of heated thermoplastics material.

Inner mould tool 20 and half outer mould tools 22a and 22b are driven between the open and closed positions relative to one another, and relative to web 4 and to inner mould tool 20, by a drive mechanism 40. Drive mechanism 40 is coordinated with drive 6a–e for feeding web 4, with hole punching station, and with the injection of heated thermoplastics material through injection passage 36, so as to provide a continuous production of moulded opening devices 16 on web 4.

Figure 3:
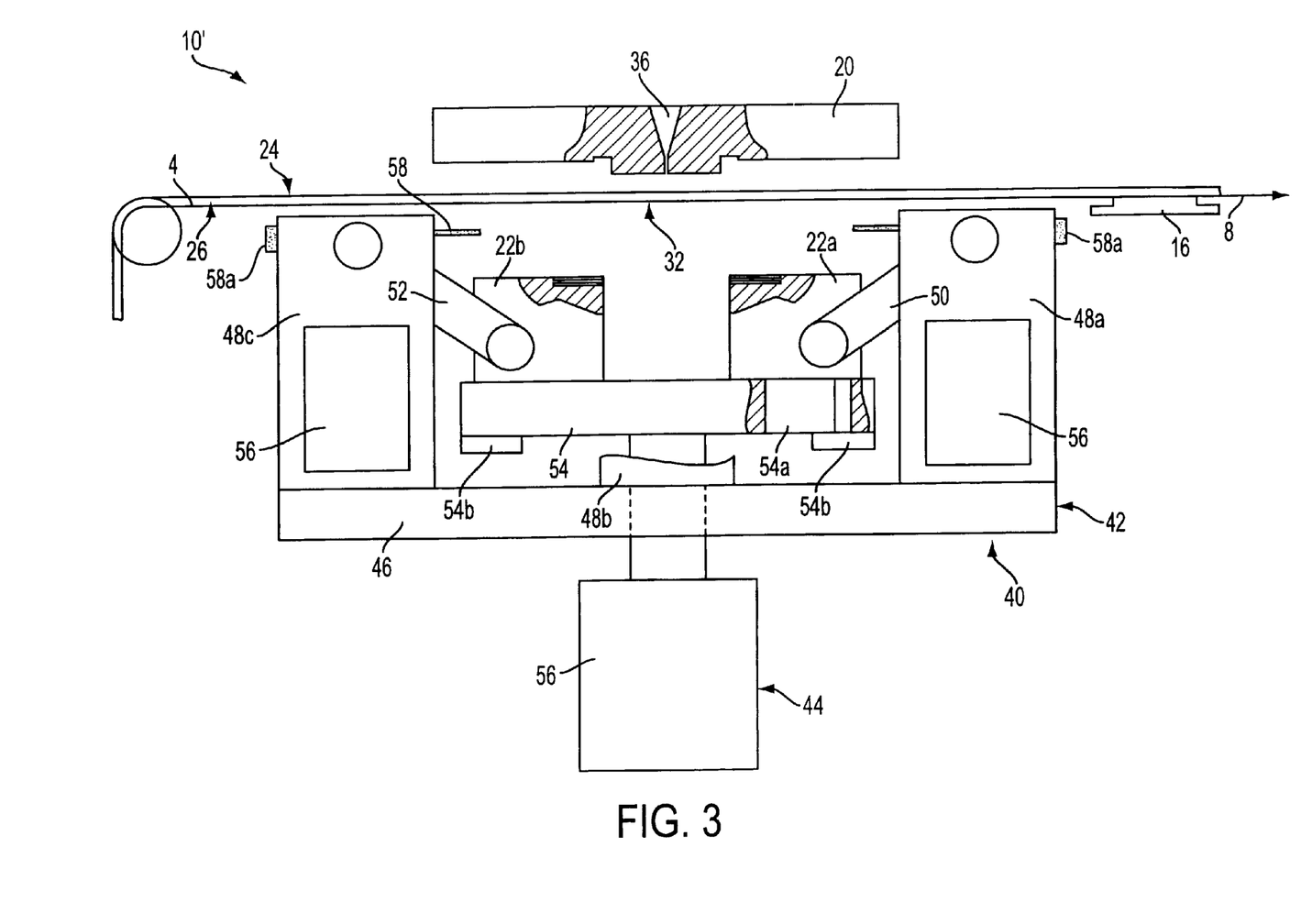
FIG. 3 is a partially sectional side elevation view of the opening device moulding station of FIG. 2 in which the mould tools are in an open position.

Drive mechanism 40 includes a supporting structure 42 for supporting half outer mould tools 22a and 22b such that in the open position half outer mould tools 22a and 22b are mutually spaced from each other in an extension plane extending substantially parallel to the plane of extension of web 4 (FIG. 3) and such that in the closed position half outer mould tools 22a and 22b are mutually arranged in contact with each other and with second web side 26 (FIGS. 4a–4b). Drive mechanism 40 also includes a driver 44 for moving half outer mould tools 22a and 22b from the open position to the closed position and vice versa such that the direction of movement of each of half outer mould tools between the open and closed positions includes a directional component extending parallel to the extension plane of web 4 and a directional component extending perpendicularly to the extension plane of web 4.

The particular configuration of drive mechanism 40 which moves half outer mould tools 22a and 22b in such directions as they move between the open and closed positions advantageously allow to effectively form opening devices of many various shapes which may include in particular portions which protrude and extend in a plane which is parallel to the extension plane of web 4.

Moreover, the particular configuration of drive mechanism 40 is such that outer half mould tools 22a and 22b mutually arrive and make contact together at the closed position with a delicate approach since the movement of each of outer half mould tools 22a and 22b may include a direction component parallel to the extension plane of web 4 which is minimised while still achieving mutual contact in the closed position, such a delicate approach of outer half mould tools 22a and 22b advantageously provides for minimum wear of outer half mould tools 22a and 22b.

In a most preferred embodiment such as that shown in FIGS. 2–4a, drive mechanism 40 is configured such that the direction of movement of each of outer half mould tools 22a and 22b between the open and closed positions tangentially follows a circular path. In this manner, the direction movement component parallel to the extension plane of web 4 of outer half mould tools 22a and 22b at the approach and release phases most near the closed position may be minimised virtually to zero while such direction movement component parallel to the extension plane of web 4 in phases away from the closed position may be rapidly increased, so as to minimise the space requirements of opening device moulding station 10' and so as to minimise wear on outer half mould tools 22a and 22b, while still maintaining flexibility with regard to forming opening devices of different shapes.

Supporting structure 42 includes a fixed support frame having a horizontal base 46 and arm pairs 48a–c extending vertically upward from base 42. Supporting structure further includes lever pairs 50 and 52 freely pivoted respectively between lateral arm pairs 48a and 48c and outer half mould tools 22a and 22b about pivot axes which extend substantially parallel to the plane of extension of web 4.

Supporting structure 42 further includes a horizontal slide plate 54 having slots 54a in which bolts 54b connected to each of outer half mould tools 22a and 22b are slidably accommodated. Slots 54a extend in slide plate 54 such that each of outer half mould tools 22a and 22b are slidably supported on slide plate 54 in a linear direction extending parallel to web feed direction 8.

Driver 44 includes a fluid-actuated cylinder 55 having a stem slidably extending through fixed base 46 and connected to slide plate 54 for reciprocatingly moving slide plate 54 in a vertical direction extending perpendicularly to the extension of web 4.

This particular configuration of drive mechanism 40 causes outer half mould tools 22a and 22b to move between the open and closed positions along a circular path centred about the pivot axes respectively of lever pairs 50 and 52 and lateral arms 48a and 48c.

The dimensions of outer halt mould tools 22a and 22b, of lateral arms 48a and 48c, and of lever pairs 50 and 52 are such that when outer half mould tools 22a and 22b are arranged in contact in the closed position, a contact force between the mating surfaces of outer half mould tools 22a and 22b is created sufficient to provide an adequate seal of mould cavity 28 such that heated thermoplastics material will not leak excessively out of mould cavity 28 at the location of the mating surfaces of outer half moulds 22a and 22b. According to a further aspect of the invention, there is provided an adjustable biasing device for adjustably setting the contact force between outer half moulds 22a and 22b in the closed position.

For this purpose, lateral arms 48a and 48c are provided with through gaps 56 which make lateral arms 48a and 48c relatively flexible in a direction parallel to web feed direction 8, and a pair of tension rods 58 are interconnected between lateral arms 48a and 48c. Tension rods 58 are freely slidably disposed in central arms 48b, and adjustment nuts 58a are adjustably screwed at the ends of tension rods 58.

FIG. 4a illustrates the outward flexure of lateral arms 48a and 48c when outer half mould tools 22a and 22b are in the closed mating position, and adjustment of nuts 58a will properly select the desired contact force between half mould tools 22a and 22b in the closed position.

The configuration of supporting structure 42 is such that in the closed position of outer half mould tools 22a and 22b (FIG. 4), the portion of web 4 which is in contact with outer half mould tools 22a and 22b extends in a plane which is distally spaced from the normal plane of extension of web 4 in the open position of outer half mould tools 22a and 22b (FIG. 3). In this manner, web 4 in the spaced position from its normal extension is put under an added tension which advantageously facilitates the release of web 4 and moulded opening device 16 from mould tools 20 and 22 as such mould tools 20 and 22 move away from the closed position to the open position.

Figure 5:
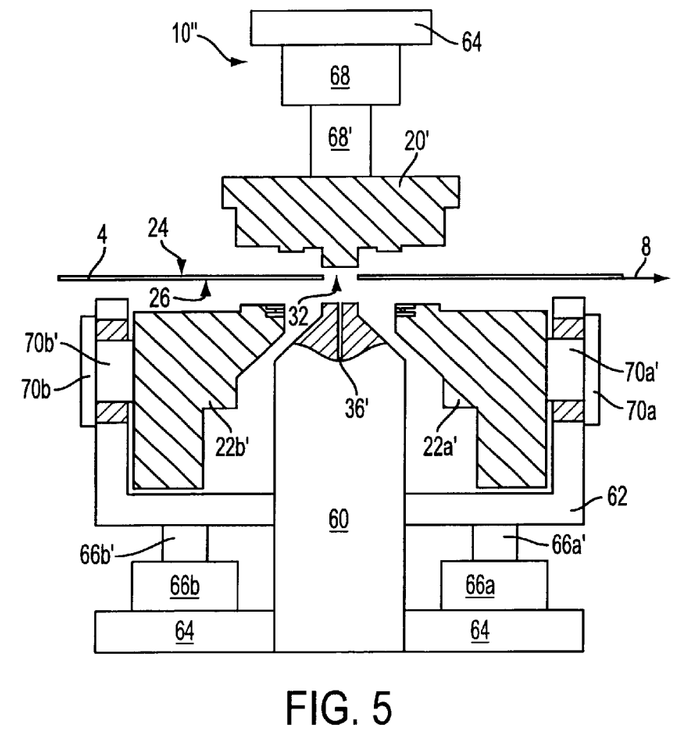
FIG. 5 is a partially sectional side elevation view of an opening device moulding station in a second preferred embodiment of the invention, in which the mould tools are in an open position.
Figure 6A:
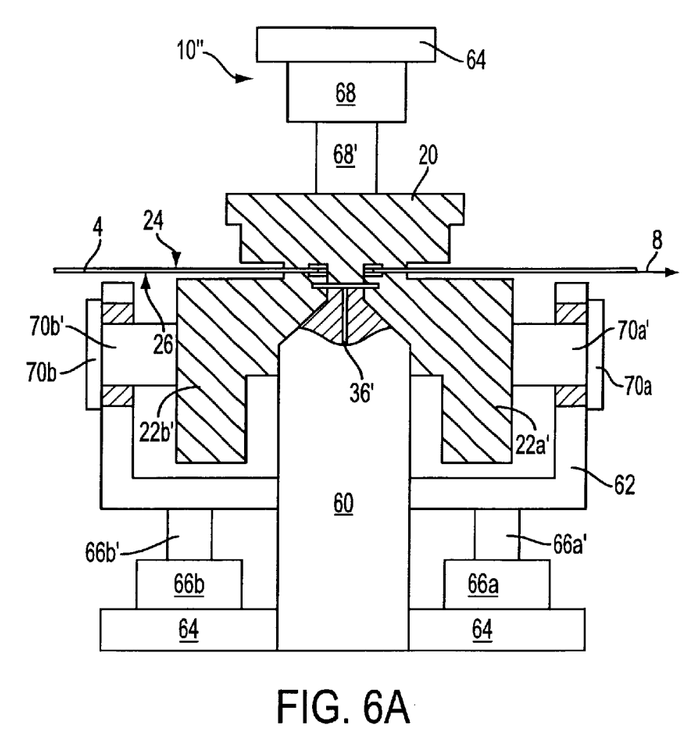
FIG. 6a is a partially sectional side elevation view of the opening device of FIG. 5 in which the mould tools are in a closed position.
Figure 6B:
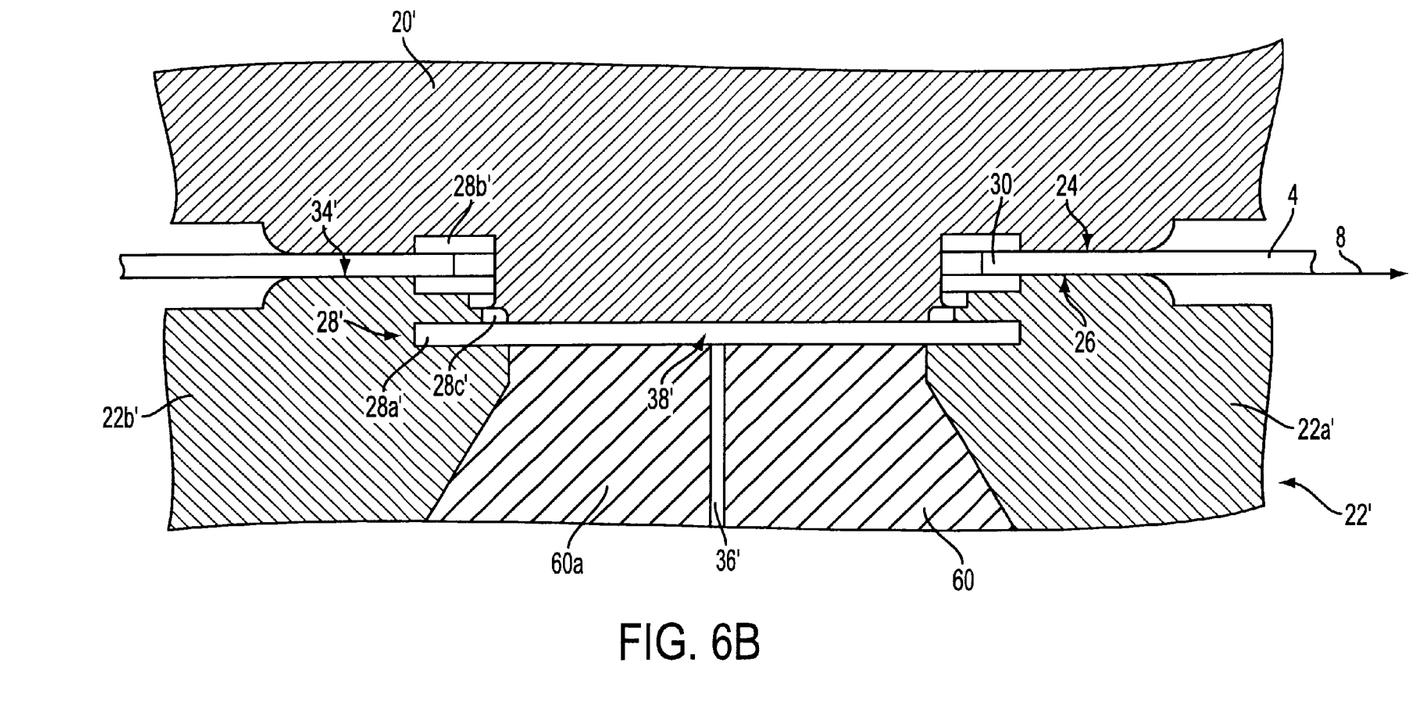
FIG. 6b is an enlarged sectional detail view of the web disposed between the mould tools of FIG. 6a in the closed position forming a mould cavity ready for heated thermoplastics injection moulding.

FIGS. 5–6b show a second preferred embodiment of opening device moulding station 10". Opening device moulding station 10" includes a first mould tool 20' and a second mould tool 22' which are arrangeable relative to web 4 in closed positions so as to be in contact respectively with a first side 24 of web 4 and a second side 26 of web 4 (FIGS. 6a and 6b), when web 4 is in a stopped position at opening device moulding station 10". First mould tool 20' and second mould tool 22' are also arrangeable relative to web 4 in open positions so as to be positioned distally respectively from first web side 24 and second web side 26 (FIG. 5), so as to allow the intermittent feeding of web 4 in feed direction 8. First mould tool 20' includes a single inner mould tool 20' movable in a vertical direction, and second mould tool 22' includes a pair of lateral outer mould tools 22a' and 22b' each movable in the vertical and a horizontal direction. Inner mould tool 20' and lateral outer mould tools 22a' and 22b' are driven between the open and closed positions relative to one another, and relative to web 4, by a drive mechanism which is described hereinafter.

With reference to FIG. 6b, in the closed moulding positions of inner mould tool 20' and lateral outer mould tools 22a' and 22b', a mould cavity 28' is formed between inner mould tool 20' and lateral outer mould tools 22a and 22b in which hole edge 30 of hole 32 in web 4 correctly positioned at opening device moulding station 10" is accommodated. Mould cavity 28' includes a portion 28a' for forming a lid portion of the opening device 16, a portion 28b' for forming a base portion of opening device 16 far connection to web 4, and a connecting portion 28c' for forming a reduced thickness tearing edge of opening device 16 for aiding in releasing the lid portion from the base portion.

The entire hole edge 30 is preferably arranged inside base forming portion 28a' prior to injection, while base forming portion 28b' is circumferential and has a dimension sufficient to completely enclose hole edge 30. Preferably, base forming portion 28b' and connecting portion 28c' are ovular ring-shaped in a longitudinal cross section extending substantially parallel to the extension of web 4, and lid forming portion 28a' is ovular disc-shaped in a longitudinal cross section extending substantially parallel to the extension of web 4. Moreover, in the closed moulding position a gap 34' is formed between upper and lower mould tools 20' and 22' which preferably has a width dimension smaller than the thickness of packaging web material 4 thereby to compress web 4 inside gap 34' and form a seal sufficient to prevent any significant leakage of the heated thermoplastics material outside of mould cavity 28'.

Opening device moulding station 10" further includes an injection passage 36' for injecting heated thermoplastics material into mould cavity 28'. Injection passage 36' extends in a fixed injection head 60 which has an upper end portion 60a forming part of second mould tool 22', as seen in FIG. 6b. Accordingly lateral outer mould tools 22a' and 22b' are movably arrangeable with respect to fixed upper end portion 60a in the closed moulding position, forming mould cavity 28'.

Injection passage 36' is configured such that thermoplastics material is injected directly into mould cavity 28' at an injection point 38' of mould cavity 28' which is located distally from hole edge 30, thereby to achieve the advantageous effects as obtained by the above described first embodiment of opening device moulding station 10'. Injection passage 36' moreover extends in outer mould tool 22' in a direction which is substantially perpendicular to the extension of lid forming portion 28c' of mould cavity 28', distally from surfaces of web 4.

The drive mechanism for driving inner mould tool 20' and lateral outer mould tools 22a' and 22b' are between the open and closed positions includes a movable support frame 62 arranged circumferentially about fixed injection head 60 and movable in a vertical direction, and a fixed support frame 64 supporting fluid-activated cylinders 66a–b and 68 having stems 66a'–b' and 68' connected respectively to movable support frame 62 and inner mould tool 20' for reciprocatingly moving these elements in the vertical direction. The drive mechanism further includes fluid-activated cylinders 70a and 70b having stems 70a' and 70b' connected respectively to lateral outer mould tools 22a' and 22b' for recipocatingly moving these elements in the horizontal direction.

The actuation of cylinders 66a–b, 68, and 70a–b is coordinated with drive 6a–e for feeding web 4, with hole punching station 10, and with the injection of heated thermoplastics material through injection passage 36', so as to provide a continuous production of moulded opening devices 16 on web 4.

What is claimed is:

1. An opening device moulding apparatus for injection moulding plastics material opening devices at holes in a packaging material sheet, comprising:

at least one first mould tool arrangeable in a closed position so as to be in contact with a first side of the sheet positioned at said opening device moulding station and arrangeable in an open position so as to be positioned distally from the first side of the sheet positioned at said opening device moulding station;

at least one second mould tool arrangeable in a closed position so as to be in contact with a second side of the sheet positioned at said opening device moulding station and arrangeable in an open position so as to be positioned distally from the second side of the sheet positioned at said opening device moulding station;

wherein in the closed positions of said first and second mould tools a mould cavity is formed between said first and second mould tools for at least partially accommodating a hole edge in the sheet positioned at said opening device moulding station;

an injection passage for injecting heated thermoplastics material into said mould cavity, wherein said injection passage extends in at least one of said first and second mould tools such that the thermoplastics material is injected directly into the mould cavity at an injection point of the mould cavity which is located distally from said hole edge accommodated in said mould cavity; and a drive mechanism for selectively moving said first mould tool and said second mould tool between said open and closed positions, at least one of said first and second mould tools including a pair of half mould tools, wherein said drive mechanism is configured such that the direction of movement of each of said half mould tools between said open and closed positions tangentially follows a circular path.

2. The apparatus of claim 1 wherein said mould cavity has a base portion for accommodating said hole edge in the closed positions of said first and second mould tools and for forming a base of said moulded opening device, and a lid portion for forming a lid of the moulded opening device.

3. The apparatus of claim 1 wherein said injection point of the mould cavity is arranged at said lid portion in a substantially central position with respect to said base portion.

4. The apparatus of claim 3 wherein said injection channel extends substantially perpendicularly to the extension of said lid portion of said mould cavity.

5. The apparatus of claim 1, wherein said drive mechanism comprises:

a supporting structure for supporting said half mould tools such that in the open position said half mould tools are mutually spaced from each other in an extension plane extending substantially parallel to the plane of extension of the sheet and such that in the closed position said half mould tools are mutually arranged in contact with each other and with said second side of the sheet; and a driver for moving said half mould tools simultaneously from the open position to the closed position and vice versa such that the direction of movement of each of said half mould tools between said open and closed positions comprises a directional component extending parallel to said extension plane and a directional component extending perpendicularly to said extension plane.

6. The apparatus of claim 5 wherein in said closed position said sheet extends in a plane which is distally spaced from the plane of extension of said sheet in said open position.

7. The apparatus of claim 5 further comprising an adjustable biasing device for adjustably setting a contact force between said half mould tools in said closed position.

8. A method for direct injection moulding of a plastics material opening device to a hole which is disposed in a sheet of packaging material and which has a hole edge, comprising the steps of:

moving at least one first mould tool from an open position to a closed position in contact with a first side of the packaging sheet material and moving at least one second mould tool from an open position to a closed position in contact with a second side of the packaging sheet material, thereby forming a mould cavity defined between said first and second mould tools in a manner such that at least a portion of said hole edge is arranged inside said mould cavity;

wherein at least one of said first and second mould tools defines a pair of half mould tools and said half mould tools are moved to define a direction of movement of each of said half mould tools between said open and closed positions that tangentially follows a circular path; and injecting plastics material into said mould cavity so as to form the plastics material opening device wherein the plastics material is injected directly into the mould cavity at an injection point of the mould cavity which is located distally from said portion of the hole edge.

9. The method of claim including arranging the first and second mould tools so as to form a mould cavity having a base portion for forming a base of the opening device and a lid portion for forming a lid of the opening device in a manner such that all of said hole edge is arranged inside said base portion of said mould cavity.

10. The method of claim 9 including injecting plastics material at an injection point arranged at the lid portion of the mould cavity in a substantially central position with respect to said hole edge.

11. The method of claim 10 including injecting plastics material through a injection channel which is disposed in one of said first and second mould tools and which extends substantially perpendicularly to the extension of said lid portion of said mould cavity.

* * * * *